United States Patent

[72] Inventor Philip Lee Bartlett
     Wilmington, Del.
[21] Appl. No. 846,269
[22] Filed July 30, 1969
[45] Patented Nov. 16, 1971
[73] Assignee E. I. du Pont de Nemours and Company
     Wilmington, Del.

[54] AMIDES OF HEXAFLUOROPROPYLENE OXIDE POLYMER ACIDS AND POLYALKYLENE OXIDE
11 Claims, No Drawings

[52] U.S. Cl. ............................................. 260/561 HL,
     106/2, 106/287, 252/8.57, 252/8.8, 252/357
[51] Int. Cl. .......................................... C07c 103/00
[50] Field of Search ................................. 260/561 X,
                                                    561 HL

[56]            References Cited
            UNITED STATES PATENTS
3,250,719  5/1966  Schmolka et al. ............ 252/152
3,274,244  9/1966  Mackenzie .................... 260/561
3,352,916  11/1967 Zech ............................. 260/584

3,101,374  8/1963  Patton ......................... 260/584

Primary Examiner—Lewis Gotts
Assistant Examiner—Ethel G. Love
Attorney—Francis J. Crowley ABSTRACT: Amides derived from hexafluoropropylene oxide polymer acids and polyalkylene oxide having the formula:

$$R_fO]CF(CF_3)CF_2O]_n(CF_3)CON-R^1O(CHR^2CHR^3O)_yR^4$$
$$\phantom{R_fO]CF(CF_3)CF_2O]_n(CF_3)CON}|\phantom{R^1O(CHR^2CHR}$$
$$\phantom{R_fO]CF(CF_3)CF_2O]_n(CF_3)CON}R^5$$

wherein $R_f$ is a perfluoroalkyl radical having one to eight carbon atoms, $n$ is an integer of zero to 100, $R^1$ is an alkylene radical having two to 12 carbon atoms, $R^2$ is hydrogen or an alkyl radical having one to four carbon atoms, $R^3$ is hydrogen or an alkyl radical having one to four carbon atoms, at least one of $R^2$ and $R^3$ in each repeating unit being hydrogen, $y$ is an integer of one to 60, $R^4$ is hydrogen or an alkyl radical having one to four carbon atoms, and $R^5$ is hydrogen or an alkyl radical having one to six carbon atoms. These amides function efficiently as surfactants and emulsifying agents.

AMIDES OF HEXAFLUOROPROPYLENE OXIDE POLYMER ACIDS AND POLYAKLYLENE OXIDE

BACKGROUND OF THE INVENTION

1. Field of the Invention

This invention relates to novel amides of hexafluoropropylene oxide polymer acids and more particularly to amides derived from hexafluoropropylene oxide polymer acids and polyalkylene oxides which function efficiently as surface-active agents and may be used as emulsifying agents even in the formation of stable emulsions of polyfluorinated compounds and water.

2. Description of the Prior Art

Mackenzie in U.S. Pat. No. 3,274,244 discloses amidoalcohols having the formula:

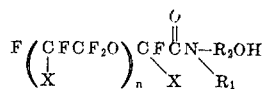

where X is F or $CF_3$, $n$ is an integer from 2 to 6, $R_1$ is hydrogen or $C_1$ to $C_4$ alkyl and $R_2$ is $C_2$ to $C_4$ alkylene. There is no suggestion of the use of these amidoalcohols as surfactants or emulsifying agents.

Ahlbrecht et al. in U.S. Pat. No. 2,915,554 disclose perfluoro alkane-sulfonamides having the formula:

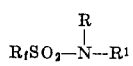

in which $R_f$ is a perfluoroalkyl group having from four to 12 carbon atoms, R is a member of the group consisting of hydrogen, lower alkyl radicals and $R^1$; and $R^1$ is a polyoxaalkyl group having the formula:

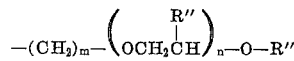

in which $m$ is an integer from 2 to 3, $n$ is a number from 2 to about 20, and each $R''$ is hydrogen or a methyl radical These sulfonamides are said to serve as surface-active agents but, in contrast to the present invention, the presence of an $-SO_2-$ group is required in all cases.

Preparation of surface-active agents by condensation of active hydrogen-containing compounds with alkylene oxide is well known in the art. Reactions such as

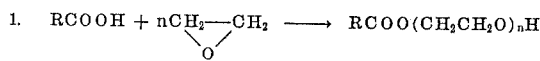

and

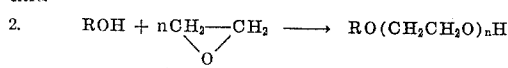

may be found for example in "Encyclopedia of Surface Active Agents" J. P. Sisley, Vol. II, p. 139, Chemical Publishing Co., Inc. New York, N.Y., 1964. These alkylene oxide extended surface-active agents are commonly referred to as nonionic surfactants in contrast to cationic or anionic surfactants which are usually characterized by the presence of a positively or negatively charged group such as

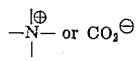

in the molecule. In contrast to these cationic and anionic surfactants, alkylene oxide extended surfactants are generally unaffected by ionizable compounds such as salts, acids and bases which might be present in the emulsion system. These nonionic alkylene oxide extended surfactants are characterized in general by the presence of an oleophilic group at one end of the molecule and a hydrophilic group at the other end which consequently impart bifunctional properties to the molecule enabling its use as an emulsifying agent. A satisfactory emulsifying agent is a material which by virtue of preferential solubility of each end of the molecule in each of the two phases reduces the surface tension of said phases so that an emulsion can result. In the usual emulsion system consisting of oleaginous material and aqueous phase, most of the above described nonionic surfactants perform satisfactorily. However, when an emulsion of polyfluorinated compounds and water is desired, the above surfactants are not satisfactory. The reason for unsatisfactory performance is that polyfluorinated materials are generally both oleophobic and hydrophobic and neither end of the molecules of most surfactants is soluble in the polyfluorinated phase. The simultaneous oleophobic and hydrophobic nature of the polyfluorinated materials can thus be utilized very effectively in the treatment of various substrates such as textiles, leather, cellulose etc. to confer both oil and water repellency to such substrates.

Novel hexafluoropropylene oxide polymer acid amides have now been discovered which are efficient surfactants, which are useful as emulsifying agents even when a stable emulsion of a polyfluorinated compound and water is desired, and which do not require the presence of an $-SO_2-$ group.

SUMMARY OF THE INVENTION

The present invention comprises compounds having the formula:

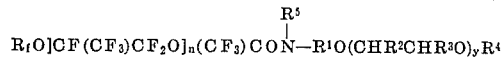

wherein $R_f$ is a perfluoroalkyl radical having one to eight carbon atoms, $n$ is an integer of 0 to 100, $R^1$ is an alkylene radical having two to 12 carbon atoms, $R^2$ is hydrogen or an alkyl radical having one to four carbon atoms, $R^3$ is hydrogen or an alkyl radical having one to four carbon atoms, at least one of $R^2$ and $R^3$ in each repeating unit being hydrogen, $y$ is an integer of 1 to 60, $R^4$ is hydrogen or an alkyl radical having one to four carbon atoms, and $R^5$ is hydrogen or an alkyl radical having one to six carbon atoms.

DESCRIPTION OF THE INVENTION

The compounds of this invention are amides derived from hexafluoropropylene oxide polymer acids and polyalkylene oxides, which amides are represented by the above formula. For practical reasons such as ease of handling while making the amides, economy, and availability or ease of preparation the values of $R_f$, $n$, $y$, $R^1$, $R^2$, $R^3$, $R^4$ and $R^5$ have been thus limited, and likewise at least one of $R^2$ and $R^3$ in each repeating unit $-(CHR^2CHR^3O)-$ has been defined as hydrogen. It is, however, conceivable that these limits could be extended to produce additional useful amides.

These compounds are useful as surface-active agents as will be seen in example 3. Further, due to the presence in each amide of hydrophilic groups as well as groups which are attractive to perfluorinated compounds, they are also useful as emulsifying agents even for perfluorinated compounds with water. Yet another utility of the amides of this invention lies in their ability to modify the surface characteristics of water and oil in such a way that the aqueous phase will spread evenly on the surface of the oil. This property is of great importance in the use of water or foam formulations for fighting hydrocarbon fires since addition of proper amounts of amides of this invention to the water or foam formulation will allow them to spread in a filmlike fashion over the surface of the hydrocarbon thus eliminating exposure of the hydrocarbon to the air and preventing reignition of the fire.

The amides of this invention are most readily prepared by first reacting the appropriate acid fluoride, e.g., $R_fO[CF(CF_3)CF_2O]_nCF(CF_3)COF$ with an aminoalcohol $R^5NH-R^1-OH$, and then reacting the resultant amidoalcohol with polyalkylene oxide as indicated below.

Step 1

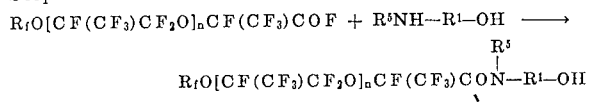

$$R_fO[CF(CF_3)CF_2O]_nCF(CF_3)COF + R^5NH-R^1-OH \longrightarrow$$

$$R_fO[CF(CF_3)CF_2O]_nCF(CF_3)CO\underset{|}{N}-R^1-OH$$
$$\phantom{R_fO[CF(CF_3)CF_2O]_nCF(CF_3)CO}R^5$$

Step 2

$$R_fO[CF(CF_3)CF_2O]_nCF(CF_3)CO\underset{|}{N}-R^1-OH + yCHR^2CHR^2 \longrightarrow$$
$$\phantom{xxxxxxxxxxxxxxxxxxxxxxxxxxxxxxxxxxx} \underset{\smash{\lower2pt\hbox{$\smile$O$\smile$}}}{\phantom{x}}$$

$$R_fO[CF(CF_3)CF_2O]_nCF(CF_3)CO\underset{|}{N}-R^1-O(CHR^2CHR_2O)_yH$$
$$\phantom{R_fO[CF(CF_3)CF_2O]_nCF(CF_3)CO}R^5$$

The aminoalcohols $R^5NH-R^1-OH$ are well known in the art. $R^1$ is an alkylene group having two to 12 carbon atoms, preferably a straight chain alkylene, e.g. $-(CH_2)_r-$ wherein $r$ is two to 12 but may be branched if desired. $R^5$ may be hydrogen or a lower alkyl group having one to six carbon atoms. It is necessary in the aminoalcohols $R^5NH-R^1-OH$, to insure stability, that the $R^5NH-$ and $-OH$ groups each be attached to different carbon atoms of $R^1$. The preferred group of aminoalcohols include ethanolamine, 2-butylaminoethanol, 3-amino-1-propanol, 3-methylamino-1-propanol, 3-propylamino-1-propanol, 4-amino-1-butanol and 4-methylamino-1-butanol.

The acid fluorides, $R_fO[CF(CF_3)CF_2O]_nCF(CF_3)COF$, utilized in the preparation of the compounds of this invention can be prepared by polymerizing hexafluoropropylene oxide alone or with a compound such as a carbonyl or acid fluoride in the presence of fluoride catalysts such as cesium fluoride. The nature of $R_f$ is determined by the appropriate choice of compounds polymerized with hexafluoropropylene oxide. Polymerization of hexafluoropropylene oxide by itself gives polyfluoroalkyl ether acyl fluoride in which $R_f$ is $CF_3CF_2CF_2-$; polymerization in the presence of $COF_2$ gives $R_f=CF_3$; polymerization in the presence of perfluoroaliphatic acyl fluoride, $C_aF_{2a+1}COF$, wherein $a$ is 1 to 8 gives $R_f=C_aF_{2a+1}CF_2-$. These preparations may be found in U.S. Pat. Nos. 2,250,808; 3,274,239; and 3,322,826, and French Pat. Nos. 1,359,426 and 1,362,548.

The following examples describe the invention in further detail. These examples are intended to be merely illustrative of the invention and not in limitation thereof. Unless otherwise indicated all parts are by weight.

EXAMPLE 1—PREPARATION OF THE AMIDE $CF_3CF_2CF_2O[CF(CF_3CF_2O]_4CF(CF_3)CONHCH_2CH_2O(CH_2CH_2O)_{10}H$

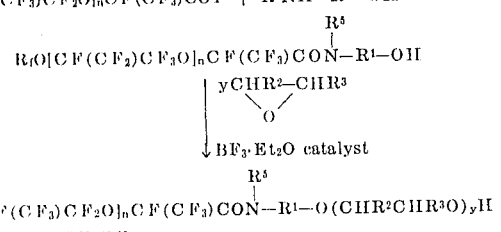

where $R_f = CF_3CF_2CF_2$ $CF_3CF_2CF_2O[CF(CF_3)CF_2O]_nCF(CF_3)COF$ ($n=4$, 50g. 0.05 mole) is combined with 250 ml. of 1,1,2-trichloro-1,2,2-trifluoroethane in a flash and the contents cooled to 10°—15° C. Ethanol amine, $NH_2CH_2CH_2OH$, (6.8 g. 0.11 mole) dissolved in 50 ml. of ethanol was then added to the flash over a period of 2 hours, maintaining the temperature in the flask in the range of 10°—15° C. The precipitated salt, ethanol amine hydrofluoride, was removed by filtration and the filtrate washed with water until the wash water was neutral. The washed solution of trichlorotrifluoroethane was then dried over anhydrous sodium sulfate. After removal of the solvent trichlorotrifluoroethane by distillation or evaporation $CF_3CF_2CF_2O[CF(CF_3)CF_2O]CF(CF_3)CONHCH_2CH_2OH$ was obtained as viscous oil 50.5 g. (97 percent).

Fluorine percent calculated 64.0, Fluorine percent found 63.9

Nitrogen percent calculated 1.4, Nitrogen percent found 1.3

The amidoalcohol prepared above (50 g. 0.05 mole) was placed in an autoclave with ethylene oxide (25 g. 0.57 mole) and born trifluoride diethyletherate complex (0.8 g. 0.006 mole) and heated at 80° C. for 4 hours at which time the pressure in the autoclave was down to essentially atmospheric. The reaction product was topped by subjecting to heating at 50° C. and 5 mm. Hg. pressure until constant weight was obtained. This operation removed any low boiling impurity including 1,4-dioxane formed by dimerization of ethylene oxide.

TABLE I

| | Analysis | | Product percent yield |
|---|---|---|---|
| | Percent fluorine | | |
| $R_f=CF_3CF_2CF_2-$ | Calc'd | Found | |
| 1. $R_fO[CF(CF_3)CF_2O]CF(CF_3)CONHCH_2CH_2O(CH_2CH_2O)_{15}H$ | 26.9 | 26.6 | 97.3 |
| 2. $R_fO[CF(CF_3)CF_2O]CF(CF_3)CON(CH_3)CH_2CH_2O(CH_2CH_2O)_{14}H$ | 27.6 | 27.4 | 98.4 |
| 3. $R_fO[CF(CF_3)CF_2O]_4CF(CF_3)CONHCH_2CH_2O(CH_2CH_2O)_{10}H$ | 45.0 | 44.8 | 97.7 |
| 4. $R_fO[CF(CF_3)CF_2O]_{36}CF(CF_3)CONHCH_2CH_2O(CH_2CH_2O)_7H$ | 63.2 | 63.0 | 93.4 |

EXAMPLE 2—EMULSION FORMATION

The utility of the compounds of the present invention as emulsifiers for polyfluorinated compounds and water is evident from the data shown in table II below. The emulsion samples utilized in these tests were of two types, one made up of water, 1,1,2-trichloro-1,2,2-trifluoroethane (designated A in the table) and a designated compound of this invention and the other made up of water, an isomeric mixture of bis(trifluoromethyl) perfluorocyclobutane (designated B in the table) and a designated compound of this invention. After preparation of the emulsion samples, they were allowed to sit for approximately 5 days before the commencement of emulsion stability testing which consisted of visual observance of the status of the emulsion of each sample.

TABLE II.—EMULSIONS

| | | Emulsion system | | | |
|---|---|---|---|---|---|
| | Conc. (g./100 ml.) | Parts by vol. | | | Emulsion stability |
| Compound ($R_f=CF_3CF_2CF_2-$) | | Water | A | B | |
| 1. $R_fO[CF(CF_3)CF_2O]CF(CF_3)CONHCH_2CH_2O(CH_2CH_2O)_{15}H$ | 2.0 | 5 | 95 | | Good. |
| 2. $R_fO[CF(CF_3)CF_2O]_4CF(CF_3)CONHCH_2CH_2O(CH_2CH_2O)_{10}H$ | 2.0 | 5 | | 95 | Do. |
| 3. $R_fO[CF(CF_3)CF_2O]_{36}CF(CF_3)CONHCH_2CH_2OCH_2CH_2)_7H$ | 2.0 | 5 | 95 | | Do. |

EXAMPLE 3—SURFACE TENSION

The utility of the compounds of the present invention as surface-active agents is clearly demonstrated by the data summarized in table III below which shows measurements of surface tensions of the dilute aqueous solutions of these compounds at 25° C. using a Du Nouy tensiometer. It is to be noted that even at a concentration as low as 0.001 percent, outstanding effectiveness in lowering the surface tension is shown. The measured surface tension of water at 25° C. was 71.9 dynes/cm.

TABLE III

| Compound concentration (gm./100 ml.) | Surface tension (dynes/cm.) | | | | |
|---|---|---|---|---|---|
| | 0 | 0.001 | 0.01 | 0.1 | 1.0 |
| Compound ($R_f=CF_3CF_2CF_2-$): | | | | | |
| 1. $R_fO[CF(CF_3)CF_2O]CF(CF_3)CON(CH_3)CH_2CH_2O(CH_2CH_2O)_{14}H$ | 71.9 | 33.7 | 24.3 | 19.7 | 15.7 |
| 2. $R_fO[CF(CF_3)CF_2O]CF(CF_3)CONHCH_2CH_2O(CH_2CH_2O)_{15}H$ | | 34.8 | 26.1 | 20.0 | 15.5 |
| 3. $R_fO[CF(CF_3)CF_2O]_4CF(CF_3)CONHCH_2CH_2O(CH_2CH_2O)_{10}H$ | | 27.0 | 18.3 | 18.2 | |

EXAMPLE 4—AQUEOUS FILM SPREADING ON HYDROCARBON SURFACE

The compounds of the present invention in contrast to many surfactants allow a film of water or foam to spread uniformly on the surface of hydrocarbons. As discussed previously, this property is of great importance when these amides are used in water or foam formulations employed in fighting hydrocarbon fires. The film-spreading test of this example was carried out by placing 10 drops of a water solution of the surfactant compound on the surface of cyclohexane which was in a 125-mm. diameter evaporating dish and the time required for the aqueous film to completely cover the cyclohexane surface was recorded. The results of this test are shown in table IV below.

TABLE IV.—Aqueous Film Spreading

| Compound ($R_f=CF_3CF_2CF_2-$) | Percent by wt. | Film spreading (sec.) |
|---|---|---|
| $R_fO[CF(CF_3)CF_2O]CF(CF_3)-CONHCH_2CH_2O(CH_2CH_2O)_{15}H$ | 0.1 | 200 |
| | 1.0 | 15 |

While the present invention is illustrated in terms of amides having a perfluoroalkyl radical designation for $R_f$, it is quite conceivable that the hexafluoropropylene oxide polymerization could take place in the presence of a perfluoroaromatic acyl fluoride such as $C_6F_5COF$ and that the resultant $R_f$, e.g., $C_6F_5CF$—could be utilized in the same manner as a perfluoroalkyl radical in the production of an equally effective amide.

The foregoing detailed description has been given for clarity of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A compound represented by the formula:

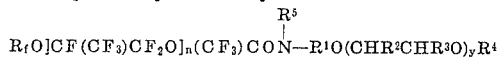

wherein $R_f$ is a perfluoroalkyl radical having one to eight carbon atoms, $n$ is an integer of 0 to 100, $R^1$ is an alkylene radical having two to 12 carbon atoms, $R^2$ is hydrogen or an alkyl radical having one to four carbon atoms, $R^3$ is hydrogen or an alkyl radical having one to four carbon atoms, at least one of $R^2$ and $R^3$ in each repeating unit being hydrogen, $y$ is an integer of 1 to 60, $R^4$ is hydrogen or an alkyl radical having one to four carbon atoms, and $R^5$ is hydrogen or an alkyl radical having one to six carbon atoms.

2. A compound according to claim 1 wherein $R_f$ is $CF_3CF_2CFB2-$.

3. A compound according to claim 1 wherein $R_f$ is $CF_3-$.

4. A compound according to claim 1 wherein $R^1$ is a straight chain alkylene radical having two to 12 carbon atoms.

5. A compound according to claim 1 wherein $R^1$ is an alkylene radical having two carbon atoms.

6. A compound according to claim 1 wherein $R^2$ is hydrogen.

7. A compound according to claim 1 wherein $R^3$ is hydrogen.

8. A compound according to claim 1 wherein both $R^2$ and $R^3$ are hydrogen.

9. A compound according to claim 1 wherein $R^5$ is hydrogen.

10. A compound according to claim 1 wherein $R^5$ is an alkyl radical having one to six carbon atoms.

11. A compound according to claim 1 having the formula: $CF_3CF_2CFO[CF(CF_3)CF_2O]_4CF(CF_3)CONHCH_2CH_2O(CH_2CH_2O)_{10}H$

* * * * *

PO-1050
(5/69)

UNITED STATES PATENT OFFICE
CERTIFICATE OF CORRECTION

Patent No. 3,621,059      Dated November 16, 1971

Inventor(s) Philip Lee Bartlett

It is certified that error appears in the above-identified patent and that said Letters Patent are hereby corrected as shown below:

In claim 1, column 5, line 51, the formula should read:

$$R_fO[CF(CF_3)CF_2O]_nCF(CF_3)CON-R^1-O(CHR^2CHR^3O)_yR^4$$
with $R^5$ on the N.

In claim 2, column 6, line 21, "$CF_3CF_2CFB2-$" should read -- $CF_3CF_2CF_2-$ --.

In claim 11, column 6, lines 47 and 48, the formula should read:

$$CF_3CF_2CF_2O[CF(CF_3)CF_2O]_4CF(CF_3)CONHCH_2CH_2O(CH_2CH_2O)_{10}H$$

Signed and sealed this 30th day of May 1972.

(SEAL)
Attest:

EDWARD M. FLETCHER, JR.
Attesting Officer

ROBERT GOTTSCHALK
Commissioner of Patents